United States Patent
Chen et al.

(10) Patent No.: US 9,654,284 B2
(45) Date of Patent: May 16, 2017

(54) GROUP BASED BOOTSTRAPPING IN MACHINE TYPE COMMUNICATION

(75) Inventors: You Lei Chen, Beijing (CN); Ya Zhe Zhang, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 235 days.

(21) Appl. No.: 14/375,516

(22) PCT Filed: Feb. 2, 2012

(86) PCT No.: PCT/CN2012/070845
§ 371 (c)(1),
(2), (4) Date: Jul. 30, 2014

(87) PCT Pub. No.: WO2013/113162
PCT Pub. Date: Aug. 8, 2013

(65) Prior Publication Data
US 2015/0012744 A1    Jan. 8, 2015

(51) Int. Cl.
| | | |
|---|---|---|
| H04L 29/06 | (2006.01) | |
| H04L 9/08 | (2006.01) | |
| H04W 12/04 | (2009.01) | |
| H04L 9/32 | (2006.01) | |
| H04W 4/00 | (2009.01) | |

(52) U.S. Cl.
CPC ............ *H04L 9/0833* (2013.01); *H04L 9/088* (2013.01); *H04L 9/0844* (2013.01); *H04L 9/0861* (2013.01); *H04L 9/0866* (2013.01); *H04L 9/0869* (2013.01); *H04L 9/32* (2013.01); *H04W 12/04* (2013.01); *H04L 63/065* (2013.01); *H04L 2209/80* (2013.01); *H04W 4/005* (2013.01)

(58) Field of Classification Search
CPC ... H04L 9/0833; H04L 9/0844; H04L 9/0861; H04L 9/0866; H04L 9/0869; H04L 9/088; H04L 9/32; H04W 12/04
See application file for complete search history.

(56) References Cited

U.S. PATENT DOCUMENTS

| | | | |
|---|---|---|---|
| 8,098,818 B2 * | 1/2012 | Grilli | ............ H04L 12/189 380/270 |
| 2014/0075509 A1 * | 3/2014 | Holtmanns | ......... H04L 63/0869 726/3 |

FOREIGN PATENT DOCUMENTS

| | | |
|---|---|---|
| CN | 1697373 A | 11/2005 |
| CN | 1801697 A | 7/2006 |
| CN | 101087260 A | 12/2007 |

(Continued)

OTHER PUBLICATIONS

Ljubljana, Jan. 2010, Solution for Group based optimization (3GPP TSG-SA3), pp. 4.*
European Search Report application No. 12867499.1 dated Sep. 24, 2015.
3GPP TR 23.888 V1.6.0 (Nov. 2011) 3rdGeneration Partnership Project; Technical Specification Group Services and System Aspects; System Improvements for Machine-Type Communications; (Release 11).

(Continued)

*Primary Examiner* — Jeffrey Pwu
*Assistant Examiner* — Thong Truong
(74) *Attorney, Agent, or Firm* — Squire Patton Boggs (US) LLP (57) ABSTRACT

A group key is computed based on unique identifications of each member device of a group of machine type communication devices, wherein communication with a network application function is performed by using a session identification of the group, and/or by using a session identification of a member device of the group, generated based on the session identification of the group and the unique identification of the member device.

20 Claims, 9 Drawing Sheets

(56) References Cited

FOREIGN PATENT DOCUMENTS

| CN | 101888626 A | 11/2010 |
|---|---|---|
| CN | 102215474 A | 10/2011 |
| EP | 1 873 668 A1 | 1/2008 |
| WO | 2007/088504 A1 | 8/2007 |

OTHER PUBLICATIONS

3GPP TS 33.102 V11.1.0 (Dec. 2011) 3rd Generation Partnership Project; Technical Specification Group Services and System Aspects; 3G Security; Security architecture (Release 11).
3GPP TS 33.220 V11.1.0 (Dec. 2011) 3rd Generation Partnership Project; Technical Specification Group Services and System Aspects; Generic Authentication Architecture (GAA); Generic Bootstrapping Architecture (GBA) (Release 11).
3GPP TR 33.868 V0.5.0 (Jul. 2011) 3rd Generation Partnership Project; Technical Specification Group Services and System Aspects; Security aspects of Machine-Type Communications; (Release 11).
International Search Report and Written Opinion dated Nov. 15, 2012 corresponding to International Patent Application No. PCT/CN2012/070845.
China Mobile, "Solution for Group Based Optimization," 3GPP TSG-SA3 (Security), SA3#62, S3-110102, Jan. 24-28, 2010, 4 pp.
English Translation of First Office Action dated Jul. 13, 2016 corresponding to Chinese Patent Application No. 201280068826.0.

* cited by examiner

GROUP BASED BOOTSTRAPPING IN MACHINE TYPE COMMUNICATION

BACKGROUND OF THE INVENTION

Field of the Invention

The present invention relates to group based bootstrapping in machine type communication.

Related Background Art

Prior art which is related to this technical field can e.g. be found in:

[1] 3GPP TR 23.888 v1.6.0,
[2] 3GPP TR 33.868 v0.5.0,
[3] 3GPP TS 33.220 v11.1.0, and
[4] 3GPP TS 33.102 v11.1.0.

The following meanings for the abbreviations used in this specification apply:

3GPP—third generation partnership project
AKA—authentication and key agreement
AuC—authentication centre
AV—authentication vector
BSF—bootstrapping service function
GBA—generic bootstrapping architecture
HLR—home location register
HSS—home subscriber server
M2M—machine to machine
MTC—machine type communication
NAF—network application function GBA is standardized to enable network applications and end user side building a shared session secret in order to meet the requirement of secure communication. Technical details are described in [3]. In brief, GBA describes security features and a mechanism to bootstrap authentication and key agreement for application security from 3GPP AKA mechanism described in [4].

In M2M environment, because the number of MTC devices may be in an order of 100 or 1000 of current end users of mobile phones, the MTC devices are usually grouped together for control, management or data convergence, etc. to meet the need of a variety of applications. Group based optimization techniques are described in [1] and [2].

Thus, from a network application's perspective, a shared group session key may be needed for the network application to achieve secure group communication. Moreover, for the MTC devices in one group, each may need to communicate with the network application individually, and so an independent session key for each device may be also needed.

However, GBA can not establish a session key which is shared in all group members since GBA does not support group attribute. The other problem is that even if GBA is used to establish session keys between the devices of the group and the network application individually, a plurality of messages is exchanged between them, the number of the messages depending on the number of the group members. This results in low efficiency.

There are various methods and protocols to achieve group secret agreement and distribution, for example, many group based Diffie-Hellman (DH) key exchange methods are designed to establish a shared secret within a group. The main problem of all methods based on DH is that they are vulnerable to Man-In-The-Middle (MITM) attack because of no authentication mechanism between communication parties.

Some solutions are deployed which combine PKI (Public-Key-Infrastructure)/certificate and group based key exchange methods to achieve secure group communication. The disadvantage is that the cost of deployment is relatively high. Another disadvantage is that the implementation is complex and difficult because the PKI system can only be used to authenticate end-to-end, so if supporting group features, some additional process related to a group, e.g. verification of a group member, has to be added at the application layer.

SUMMARY OF THE INVENTION

The invention aims at solving the above-stated problems. In particular, the invention aims at providing an improved GBA mechanism which can cope with group based optimization of MTC devices.

This is achieved by the methods and apparatuses as defined in the appended claims. The invention may also be implemented by a computer program product.

GBA has some strong points regarding establishing a shared secret between applications and end devices. One is that there is no need for user enrolment phase or secure deployment of keys/certificates, making this solution a low cost one when compared to PKI. The second is the ease with which an authentication method may be integrated into terminals and service providers, as it may be based on HTTP "Digest access authentication".

According to the invention, usage of GBA is extended to M2M environment, and resources from application layer to network layer can be saved by using this kind of group featured GBA when the number of MTC devices is large. In the following the invention will be described by way of embodiments thereof with reference to the accompanying drawings.

DESCRIPTION OF THE EMBODIMENTS

The invention proposes enhancing a GBA mechanism used in 3G network to enable network application functions and MTC devices establishing shared keys in the granularity of a group. This is useful in M2M environment where a large number of M2M devices are controlled/managed in groups by network application functions.

The invention supposes that group information is pre-configured on application layer, for example, a group identity and an identity of a member who belongs to the group are deployed before the procedures involved in this invention.

Figure 1:
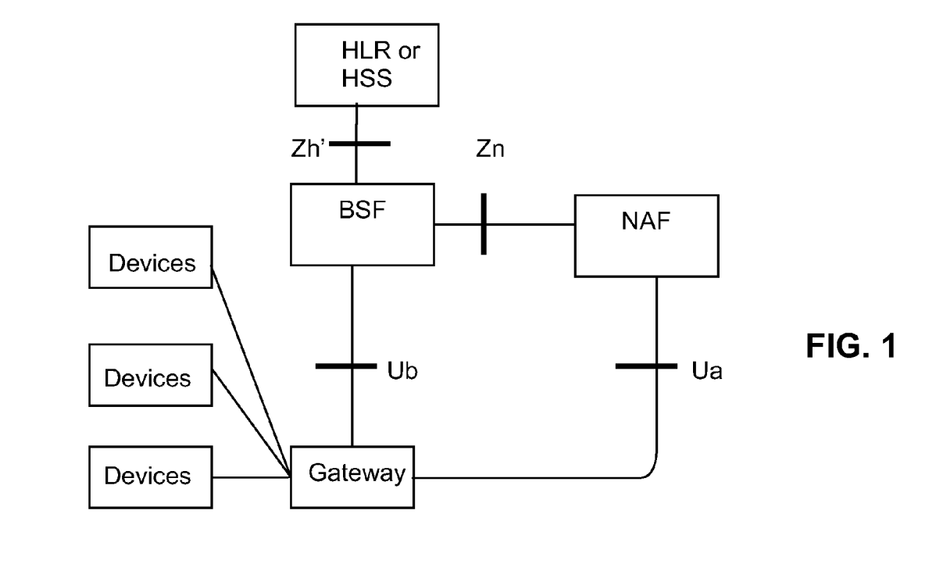
FIG. 1 shows a schematic block diagram illustrating a system architecture of GBA extended to M2M environment according to an embodiment of the invention.

FIG. 1 shows a schematic block diagram illustrating a system architecture of GBA extended to M2M environment according to an embodiment of the invention. Devices shown in FIG. 1 and a gateway form a group of MTC devices, i.e. are member devices of the group. The gateway performs authentication and key agreement procedure for the group. The interface between the devices and the gateway is implemented by private communication protocol, e.g. ZigBee, WiFi.

The gateway communicates with a BSF via Ub interface, and with an NAF via Ua interface. The BSF communications with the NAF via Zn interface, and with an HLR or HSS via Zh' interface.

An agreement of using group based GBA has to be finished before a communication between the member devices and the NAF can start. According to the invention, initiation of bootstrapping requires that the gateway first agrees whether to use the group based GBA on behalf of all group members.

Figure 2:
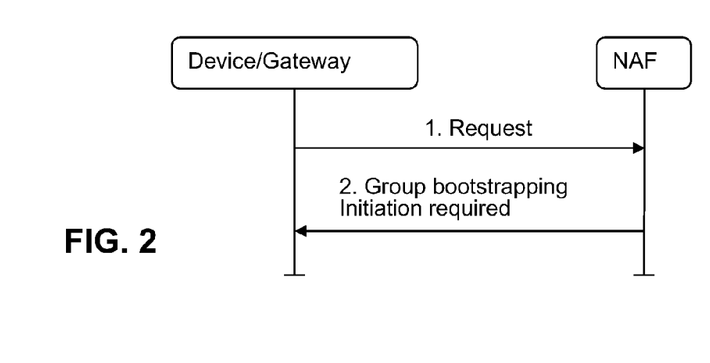
FIG. 2 shows a signaling diagram illustrating an initiation of bootstrapping according to an embodiment of the invention.

FIG. 2 shows a signalling diagram illustrating initiation of bootstrapping. This high-level procedure is comprised of the following steps:
1. A member device, e.g. one of the devices (which may be MTC devices) or the gateway, starts communication over the Ua interface with the NAF without any GBA-related parameters.
2. If the NAF requires the use of shared keys obtained by means of the group based GBA, but the request from the member device does not include group GBA related parameters, the NAF replies with a group bootstrapping initiation required message.

Figure 3:
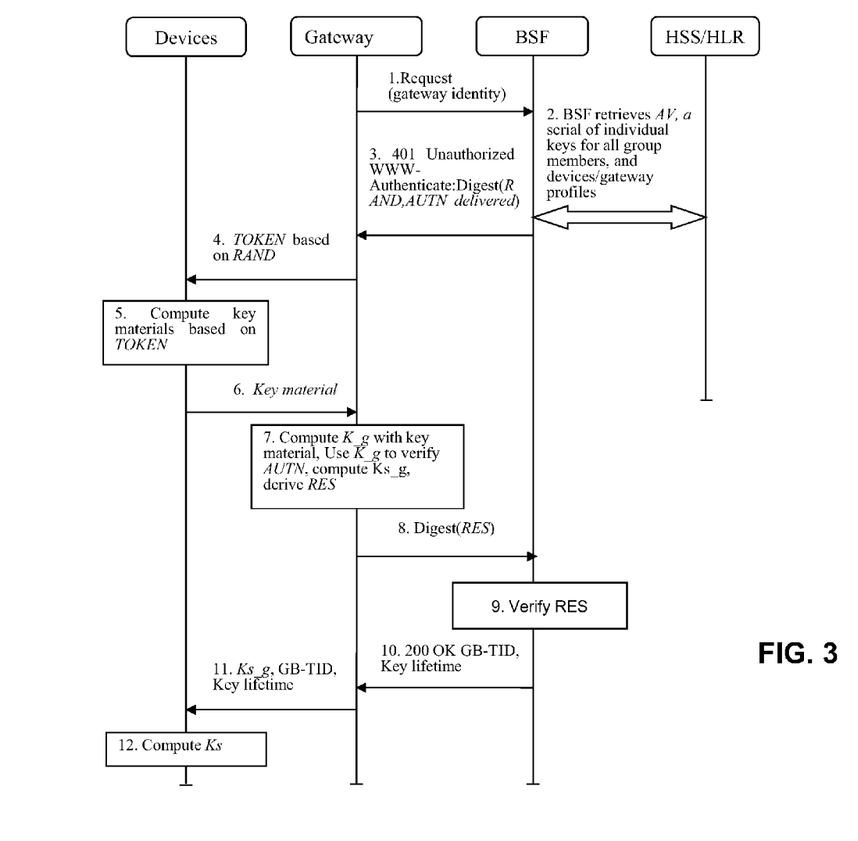
FIG. 3 shows a signaling diagram illustrating a group based bootstrapping procedure according to an embodiment of the invention.

Upon receipt of the bootstrapping initiation required message, the member device should perform bootstrapping authentication procedure which is shown in FIG. 3.

Referring to FIG. 3, the bootstrapping authentication procedure is comprised of the following steps:
1. The gateway sends an HTTP request towards the BSF with its own network identity.
2. According to the network identity of the gateway, the BSF retrieves a complete set of GBA group security settings and one authentication vector over the Zh interface from the HSS. In the group case, the HSS finds that it is a gateway that issues the request. The HSS looks up the corresponding group information in its local database. Then the HSS computes AV, a serial of individual keys Ks of all group members pertaining to this group and Ks_g. Details on this computation will be given later on.
3. Then BSF forwards RAND and AUTN received from the HSS to the gateway in the 401 message "unauthorized www-authenticate: Digest (RAND, AUTN delivered)". This is to demand the group of devices to authenticate themselves.
4. The gateway forwards a TOKEN to all of the member devices. The TOKEN is derived from the RAND.
5. Each member device computes a series of key materials from the TOKEN it received in step 4.
6. Each member device sends key material to the gateway.
7. The gateway computes K_g from all the key materials it received. Details on this computation will be given later on. Then the gateway uses K_g to verify AUTN, compute Ks_g and RES.
8. The gateway sends another HTTP request, containing the Digest AKA response (calculated using RES), to the BSF.
9. The BSF authenticates the group devices by verifying the Digest AKA response.
10. The BSF sends a 200 OK message, including GB-TID and key lifetime, to the gateway to indicate the success of the authentication.
11. The gateway forwards the 200 OK message, including GB-TID, Ks_g and key lifetime, to the member devices to indicate the success of the authentication.
12. Each member device calculates its own Ks from Ks_g.

TOKEN is a random number which is like RAND in AV used in the computation of key materials and also used to prevent replay attack.

K_g is an intermediate group key which is used to verify AUTN and RES.

Ks_g is a shared session group key generated from authentication and key agreement procedure. Usually it can be divided into two key parts: one is for confidentiality protection and the other is for integrity protection.

Ks is a shared session key generated from authentication and key agreement procedure between member devices and BSF. Usually it can be divided into two key parts: one is for confidentiality protection and the other is for integrity protection.

GB-TID is similar to B-TID in GBA, and identifies the session of this group based GBA procedure. GB-TID is introduced to identify the group based GBA procedure, which is dedicated to the group case request.

Computation at the end-points (HSS, BSF, gateway, devices) is implementation dependent. Later on, a method of computing key related parameters according to an implementation example of the invention will be described.

Now, using the group based bootstrapped security association obtained by the procedure shown in FIG. 3 will be described by referring to FIG. 4.

Figure 4:
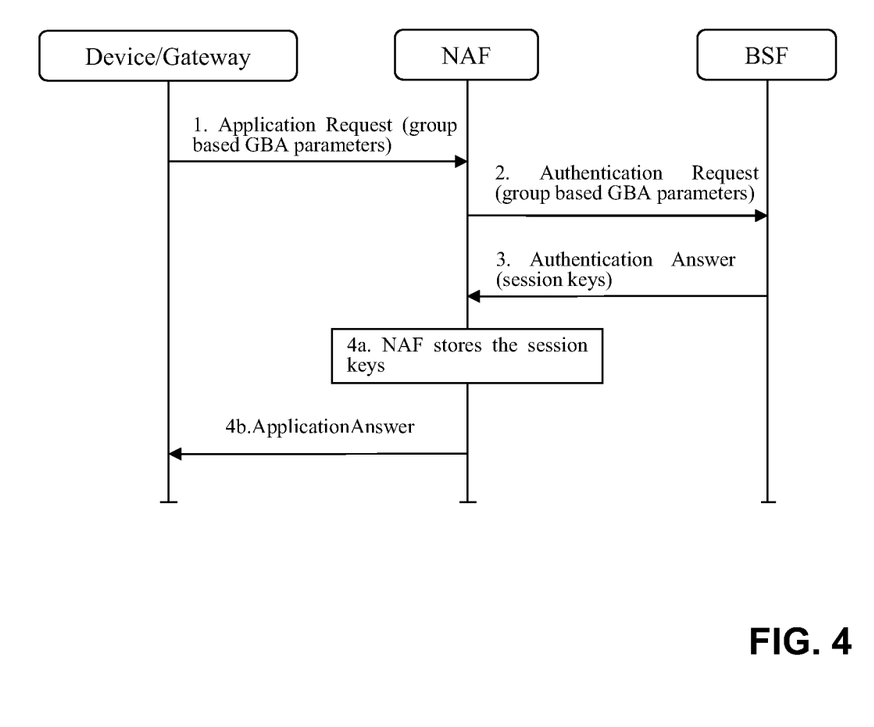
FIG. 4 shows a signaling diagram illustrating a group based GBA usage procedure according to an embodiment of the invention.

The group based GBA usage procedure shown in FIG. 4 is comprised of the following steps:
1. A member device (device/gateway) starts communication over Ua interface with the NAF by using an application request according to a protocol. The application request should contain the group based GBA parameters, e.g. GB-TID.
2. The NAF starts communication over Zn interface with the BSF by using an authentication request. The authentication request contains group based GBA parameters, e.g. GB-TID and NAF_id.
3. The BSF derives keys required to protect the protocol used over the Ua interface and sends the keys to the NAF.
4a. and 4b. The NAF stores the session keys and continues with the protocol used over the Ua interface with the member device by sending an application answer to the member device.

Later on it will be shown that the (group based) GBA parameters may be instantiated differently according to multiple options.

Now an exemplary implementation of the bootstrapping procedure according to the present invention is described. The following steps refer to the steps of FIG. 3.
1. The gateway initiates a request for group authentication to the BSF. The request may look like "req(G, IMSI, . . . )", "G" indicating that the request is a group authentication request.

2. The HSS/HLR generates AV as illustrated in FIG. 5 showing a diagram illustrating computation of an authentication vector using a key K_g according to an implementation example of the invention:

AV:=RAND∥XRES∥CK_g∥IK_g∥AUTN

Where most of the computation process is similar to AKA except for some input parameters. The steps are:
1) The HSS/HLR first computes Km_i where:
Km_i=f*(RAND, K_i) for each member device in the group.
2) Then the HSS/HLR computes K_g from all the Km_i where:
K_g=f*(H(Km_1∥Km_2∥ . . . ), K_d)). H is a kind of hash function.

Figure 5:
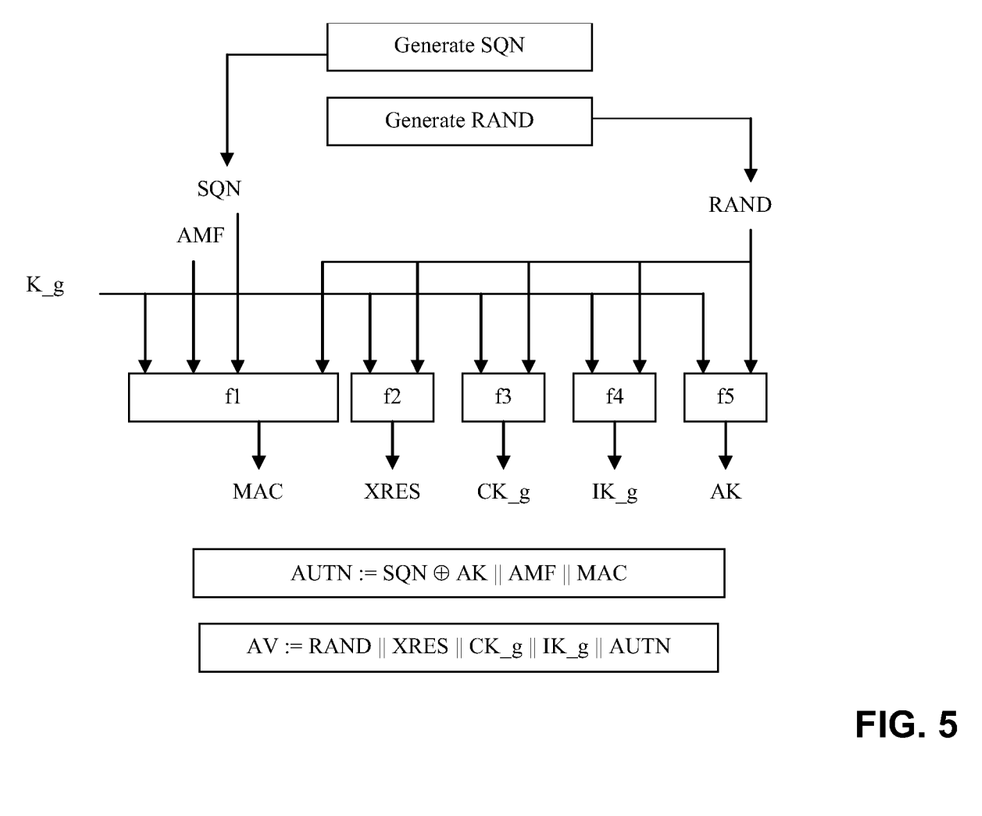
FIG. 5 shows a diagram illustrating computation of an authentication vector using a key K_g according to an implementation example of the invention.

The HSS/HLR then generates a fresh sequence number SQN and an unpredictable challenge RAND, then generates other components of AV using K_g as the input key parameter of all AKA functions as illustrated in FIG. 5.

Figure 6:
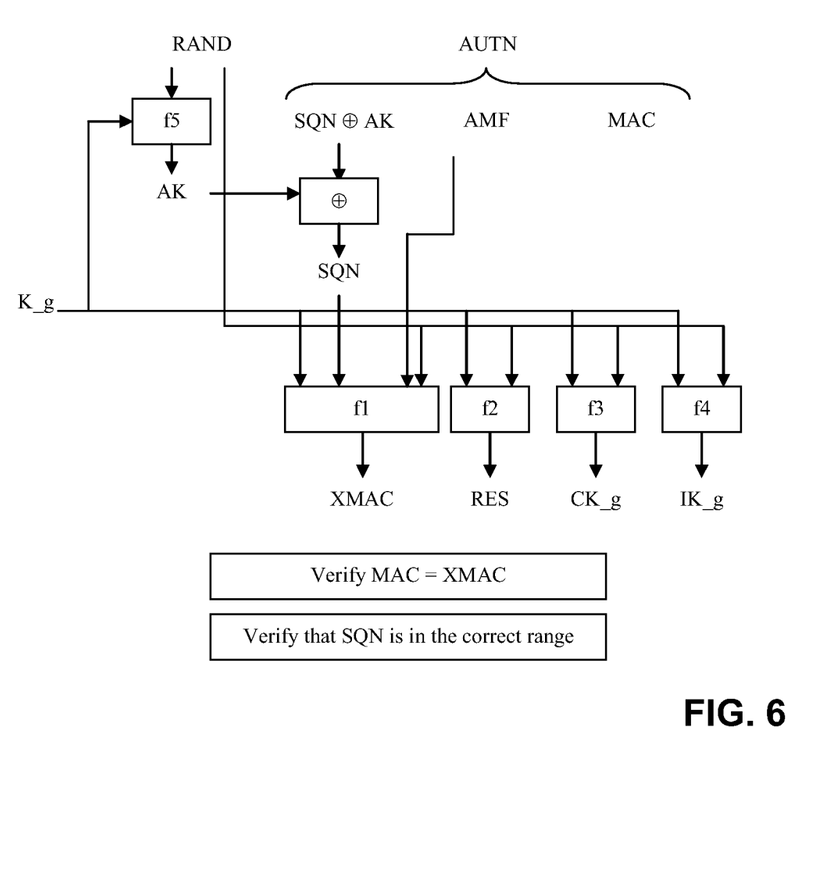
FIG. 6 shows a diagram illustrating verification of AUTN and computation of RES using K_g according to the implementation example.

The HSS/HLR also computes CK_ind, IK_ind (i.e. Ks) for all group member devices, where:
1) CK_ind=f*(F(CK_g), K_i), F being a kind of one-way function or nought.
2) IK_ind=f*(F(IK_g), K_i), F being a kind of one-way function or nought.
3. Referring to FIG. 3, in step 3. the BSF gets the AV and sends RAND and AUTN to the gateway.
4. The gateway forwards the RAND to each member device (here TOKEN is the same as RAND).
5. Each member device computes Km_i where Km_i=f* (RAND, K_i).
6. Each member device sends Km_i to the gateway.
7. The gateway performs the following steps which are illustrated in FIG. 6 showing a diagram illustrating verification of AUTN and computation of RES using K_g according to the implementation example:
  1) computing K_g where:
    K_g=f*(H(Km_1∥Km_2∥ . . . ), K_d)). H is a kind of hash function.
  2) verifying AUTN using K_g. If it holds, then:
  3) computing RES, CK_g and IK_g as done by the HSS/HLR.
8. Referring again to FIG. 3, in step 8. the gateway sends RES to the BSF using "http digest authentication" protocol.
9. The BSF first verifies RES, and if it holds goes to step 10.
10. The BSF then sends back an http response such as "200 OK" with randomly generated GB-TID, and key information, e.g. key lifetime.
11. The gateway sends to each member device CK_g and IK_g (i.e. Ks_g), GB-TID and key lifetime.
12. Each member device stores GB-TID and key lifetime, and then computes CK_ind, IK_ind (i.e. Ks), where:
  1) CK_ind=f*(F(CK_g), K_i), F being a kind of one-way function or nought.
  2) IK_ind=f*(F(IK_g), K_i), F being a kind of one-way function or nought.

f* may be one of functions used in AKA algorithm, e.g. f5. H function may be HMAC-SHA-256. F may be nought.

The meaning of notations involved in this implementation is listed below:

K_i is an initial secret shared between each SIM card deployed on member MTC devices in the group and AuC at the network side (in GBA system, HSS/HLR can retrieve this value), which uniquely identifies a legal subscribed MTC device on which the SIM card is installed. "I" is the index of group member.

K_d is an initial secret shared between a SIM card deployed in the gateway (MTC gateway) and AuC at the network side (in GBA system, HSS/HLR can retrieve this value), which uniquely identifies a legal subscribed MTC gateway on which the SIM card is installed.

Km_i is the key material provided by each member MTC device and must be joined in computation of K_g, where "i" is the index of the group member corresponding to K_i.

K_g is the key which is used by the MTC gateway to compute RES, and also used by the network side (here the HSS/HLR) to compute AV and verify RES.

CK_g is the group key shared by all members in the group for confidential protection of communication in a granularity of group.

IK_g is the group key shared by all members in the group for integrity protection of communication in a granularity of group.

Ks_g is CK_g∥IK_g, wherein ∥ is the symbol of concatenation.

CK_ind is the individual key which is only known by MTC devices and used for confidential protection of communication between MTC devices and the network. This individual key corresponds to CK generated in original AKA.

IK_ind is the individual key which is only known by MTC devices and used to protect integrity of communication between MTC devices and the network.

This individual key corresponds to IK generated in original AKA.

Ks is CK_ind∥IK_ind.

As illustrated in FIG. 3, the HSS/HLR computes a group key (intermediate group key) K_g based on unique identifications of each member device of a group of machine type communication devices, and a serial of individual keys for each member device of the group. Moreover, the gateway computes the group key K_g, and also a group key Ks_g (shared session group key) based on the key material Km_i from the member devices of the group which is derived from the initial secret K_i (unique identification) of the member devices. The BSF receives the authentication vector, a serial of individual keys Ks for the member devices and devices/gateway profiles from the HSS/HLR. The BSF may comprise processing resources, memory resources and interfaces for performing the receiving process.

When the HSS/HLR recognizes that a request has been received from a member device of the group which acts as a gateway device performing authentication and key agreement procedure for the group (the gateway in FIG. 3), the computing of the group key is performed in response to the request. The HSS/HLR computes an authentication vector from the group key and sends the authentication vector and a random value to a service function (BSF). The HSS/HLR may comprise processing resources, memory resources and interfaces for performing the above-described processes of computing, recognizing and sending.

In step 4. in FIG. 3, the gateway sends a random value (TOKEN) to the other member devices of the group, the random value being generated in the context of the authentication vector computed from the group key, and receives key materials from the member devices computed based on the random value and the unique identifications of the member devices in step 6. As described above, the gateway computes the group key from the key materials of the member devices and the unique identification of the gateway device (step 7.). The gateway sends the group key and the session identification of the group to the member devices (step 11.). The gateway computes its individual key from the group key. Further, the gateway generates its session identification based on the session identification of the group and its unique identification. The gateway may comprise processing resources, memory resources and interfaces for performing the sending, receiving, generating and computing processes.

Each of the devices computes the key material based on the random value, sends the key material to the gateway, and receives the group key and the session identification of the group from the gateway. Each of the devices computes its individual key from the group key. Moreover, each of the devices generates its session identification based on the session identification of the group and its unique identification. Each of the devices may comprise processing resources, memory resources and interfaces for performing the processes of receiving, sending, generating and computing.

As mentioned above with respect to the description of FIG. 4, the (group based) GBA parameters may be instantiated differently according to multiple options. Now three optional implementations of using these parameters (e.g. GB-TID, B-TID) are described.

Figure 7:
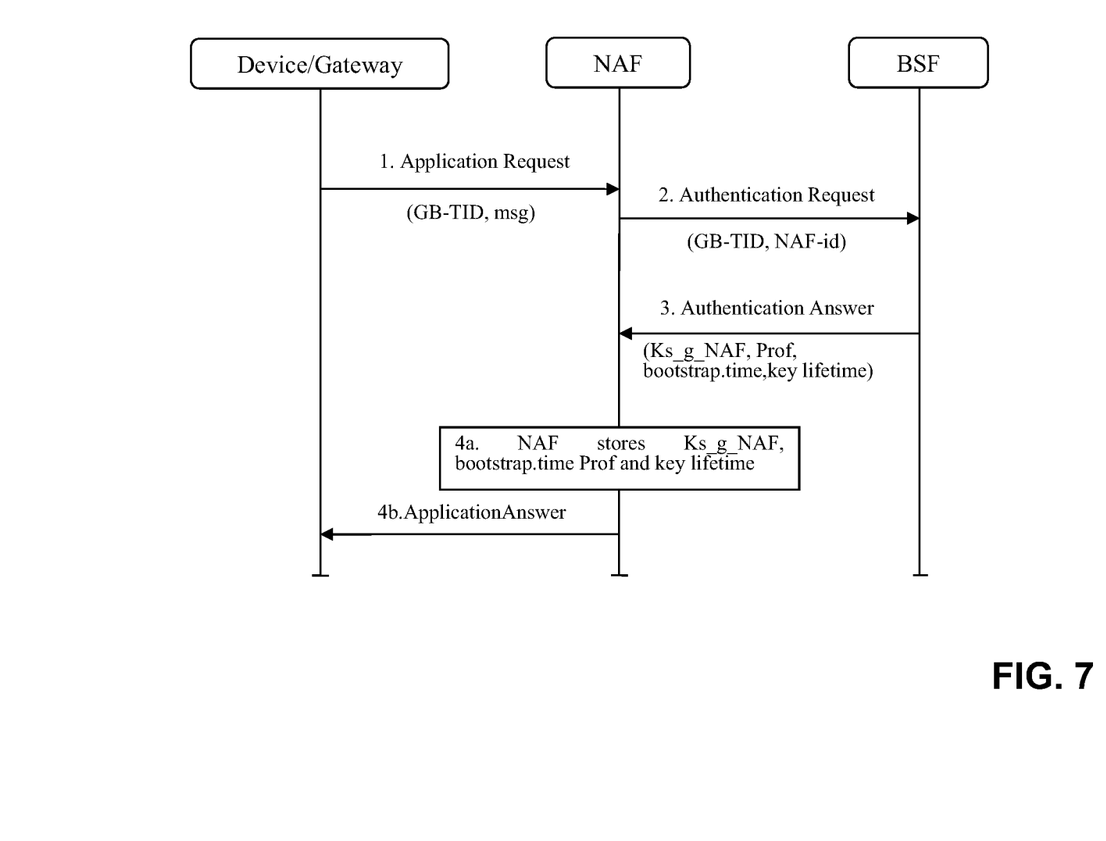
FIG. 7 shows a signaling diagram illustrating a secure group communication usage flow.

FIG. 7 illustrates a secure group communication usage flow between device/gateway, NAF and BSF according to option 1. In this scenario the NAF and member devices want to securely communicate with each other in the granularity of group. This option is useful for updating sensitive data involving all group members.

According to FIG. 7:
1. The device/gateway starts communication over Ua interface with the NAF by using an application request containing group based GBA parameters, i.e. GB-TID.
2. The NAF starts communication over Zn interface with the BSF by using an authentication request. The authentication request contains group based GBA parameters, e.g. GB-TID and NAF_id.
3. The BSF derives keys required to protect the protocol used over the Ua interface and sends the keys to the NAF in an authentication answer containing Ks_g_NAF, Prof, bootstrap.time, key lifetime.
4a. and 4b. The NAF stores Ks_g_NAF, bootstrap.time, Prof and key lifetime and continues with the protocol used over the Ua interface with the device/gateway by sending an application answer.

According to option 2, the NAF wants to securely communicate with all group members at the same time, meanwhile the NAF also has the capability of secure communication respectively with individual members of the group. The implementation usage flow is shown in FIG. 8.

Figure 8:
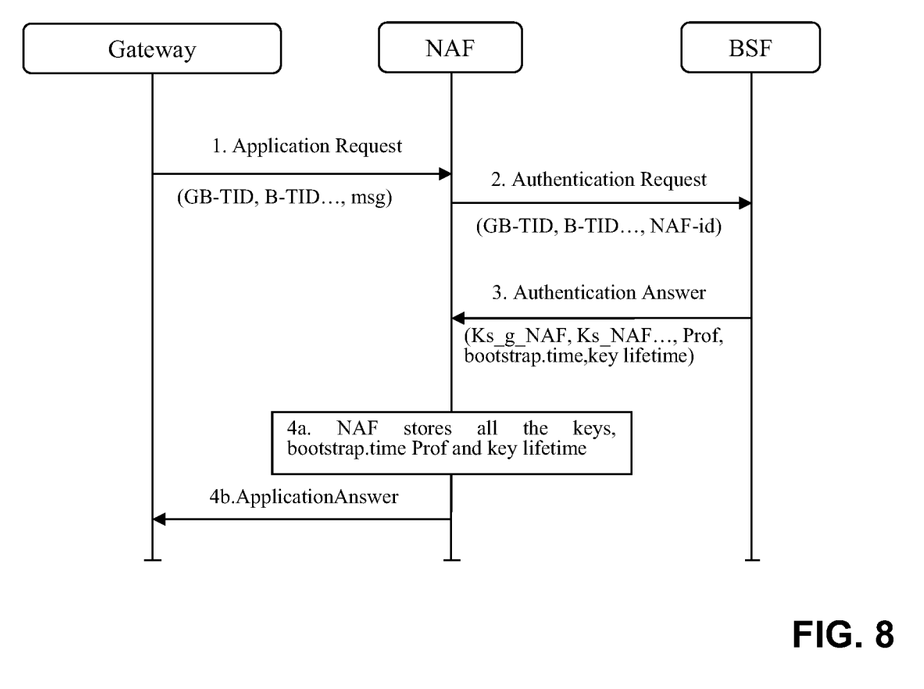
FIG. 8 shows a signaling diagram illustrating a secure group and individual communication usage flow.

According to FIG. 8:
1. The gateway starts communication over Ua interface with the NAF by using an application request containing group based GBA parameters, i.e. GB-TID, and GBA parameters, i.e. B-TID.
2. The NAF starts communication over Zn interface with the BSF by using an authentication request. The authentication request contains GB-TID, B-TID and NAF_id.
3. The BSF derives keys required to protect the protocol used over the Ua interface and sends the keys to the NAF in an authentication answer containing Ks_g_NAF, Ks_NAF . . . , Prof, bootstrap.time, key lifetime.
4a. and 4b. The NAF stores Ks_g_NAF, Ks_NAF . . . , bootstrap.time, Prof and key lifetime and continues with the protocol used over the Ua interface by sending an application answer.

In this scenario, the first request should be initiated by the gateway. The gateway can compute and store all B-TID through GB-TID by means of a one-way function using a device related identity (e.g. manufacture serial number of each member device) as input. It is supposed that the gateway and BSF know these identities of all member devices before this procedure.

In an option 3, the NAF only wants to securely communicate with a respective individual member device. The implementation flow is shown in FIG. 9 and corresponds to usual GBA.

Figure 9:
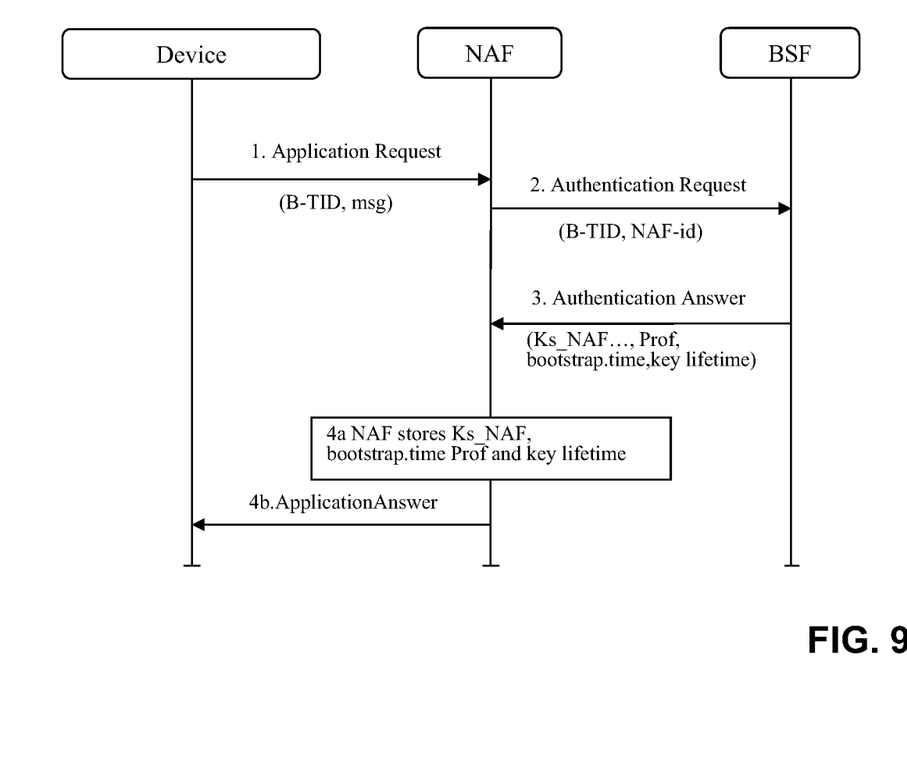
FIG. 9 shows a signaling diagram illustrating a secure individual communication usage flow.

According to FIG. 9:
1. A member device starts communication over Ua interface with the NAF by using an application request containing GBA parameters, i.e. B-TID.
2. The NAF starts communication over Zn interface with the BSF by using an authentication request. The authentication request contains B-TID and NAF_id.
3. The BSF derives keys required to protect the protocol used over the Ua interface and sends the keys to the NAF in an authentication answer containing Ks_NAF . . . , Prof, bootstrap.time, key lifetime.
4a. and 4b. The NAF stores Ks_NAF . . . , bootstrap.time, Prof and key lifetime and continues with the protocol used over the Ua interface with the respective individual member device by sending an application answer.

In this scenario, the first request should be initiated by a device. Similar to option 2, the B-TID is generated from GB-TID and the unique device identity by means of a one-way function. The computation of B-TID can be done respectively by BSF and member devices.

As illustrated in FIGS. 4 and 7 to 9, communication with a network application function is performed by a member device (device/gateway) by using a session identification of the group (e.g. GB-TID), and/or by using a session identification of a member device of the group (e.g. B-TID), generated based on the session identification of the group and the unique device identity.

Figure 10:
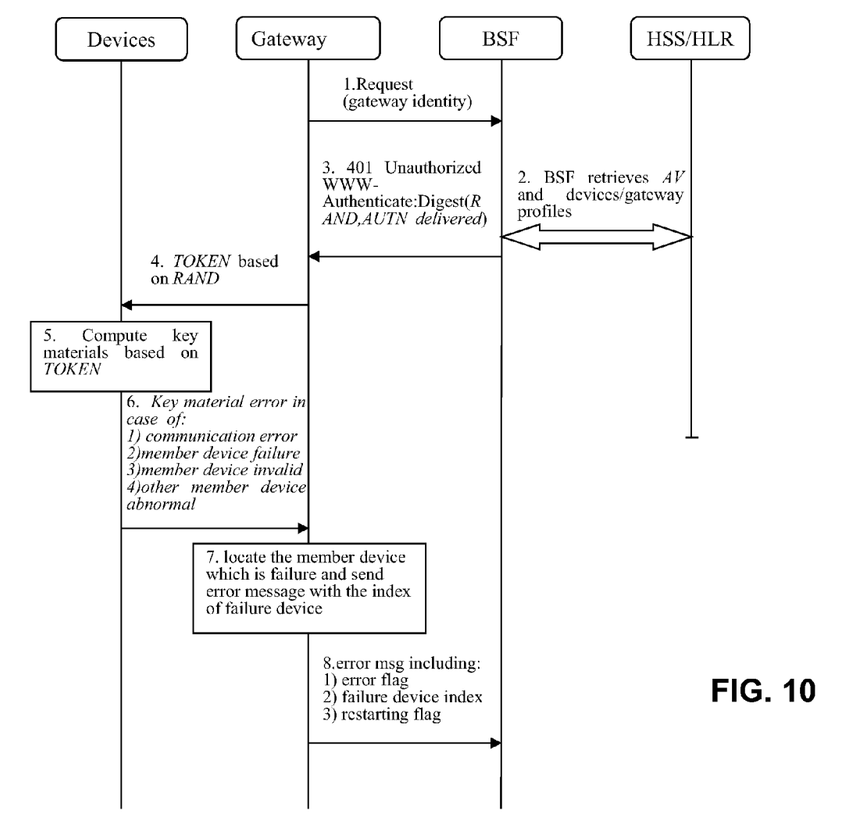
FIG. 10 shows a signaling diagram illustrating a scenario of member device failure according to an implementation example of the invention.

In the following a scenario is considered where a member device of the group has a failure and cannot send corresponding key material to the gateway. According to one solution, the gateway may first locate the index of the failure member device and send an error message including the index of the failure member device to the BSF, which then terminates the current group base bootstrapping process. A restart of the process depends on a request of the gateway. FIG. 10 illustrates this scenario.

In FIG. 10, steps 1. to 5. correspond to those of FIG. 3.
6. A key material error is indicated to the gateway in case of a communication error, a member device failure, an invalidity of a member device and an abnormality of a member device.
7. The gateway locates the failure member device.
8. The gateway sends an error message with the index of the failure member device. The error message may include an error flag, the failure member device index and a restarting flag.

In other words, the gateway detects a key material error and locates an erroneous member device of the group involving the key material error. The gateway sends an error message indicating the erroneous member device to the service function (BSF). The processing resources, memory resources and interfaces of the gateway may operate to perform the processes of detecting, locating and sending.

Compared to GBA, this invention extends the mutual authentication to all member MTC devices in the group, because the AV computation involves the initial secrets owned by each participated member MTC device who wants to authenticate to the network. It makes sure that all participated devices can be authenticated by the network simultaneously. If anyone of the member MTC devices/gateway in the group is illegal or does not know the initial secret, then the authentication must fail. On the other hand, considering the group as a whole, the member MTC devices can authenticate the network by verifying the AUTN since it only can be done when the MTC gateway has received all key materials. So the authentication of the network is done by all member MTC devices of the group, and the member MTC devices of the group must trust the result of the MTC gateway.

Compared to using GBA to authenticate N member MTC devices in the group one by one, according to the present invention the exchanged messages are reduced to 1/N.

Moreover, according to the present invention a group key Ks_g is built and shared among member MTC devices, MTC gateway and the NAF, for the purpose of confidential and integrity protection of the communication within the group. In addition, an individual key Ks is built between each member MTC device and the NAF, for the purpose of confidential and integrity protection of the communication between individual member devices and the NAF.

According to the present invention, GBA is extended to support establishment of a group shared session key while individual session keys are also supported. The simultaneous authentication and key establishment of group devices does not lead to message exploding. Rather, it keeps the same number of messages as the original GBA.

According to an aspect of the invention, an apparatus such as an HSS/HLR and gateway comprises means for computing a group key based on unique identifications of each member device of a group of machine type communication devices, wherein communication with a network application function is performed by using a session identification of the group, and/or by using a session identification of a member device of the group, generated based on the session identification of the group and the unique device identification of the member device.

The apparatus, in case it acts as an HSS/HLR, for example, may comprise means for recognizing that a request has been received from a member device of the group which acts as a gateway device performing authentication and key agreement procedure for the group, wherein the computing means perform computing of the group key in response to the request, and the computing means compute an authentication vector from the group key and a serial of individual keys for each member device of the group, and means for sending the authentication vector, the individual keys and a random value to a service function.

The apparatus, in case it acts as a gateway, for example, may comprise means for sending a random value to member devices of the group not acting as the gateway device performing authentication and key agreement procedure for the group, wherein the random value is generated in the context of an authentication vector computed from the group key, and means for receiving key materials from the member devices computed based on the random value and the unique identifications of the member devices, wherein the computing means compute the group key from the key materials of the member devices and the unique identification of the gateway device.

The sending means may send the group key and the session identification of the group to the member devices.

The apparatus may comprise means for detecting a key material error and means for locating an erroneous member device of the group involving the key material error, and the sending means may send an error message indicating the erroneous member device to the service function.

The sending means may send an application request for communication with the application network function, the application request including the session identification of the group and/or the session identification of the member device.

The apparatus, in case it acts as a BSF, for example, may comprise means for receiving a serial of individual keys for each members device of the group.

The above means may be implemented by processing resources, memory resources and interfaces of the apparatus.

According to an aspect of the invention, an apparatus such as a member device of a group of machine type communication devices, comprises means for computing a key material based on a random value which is generated in the context of an authentication vector computed from a group key and a unique identification of the apparatus, means for sending the key material to a member device of the group which acts as a gateway device performing authentication and key agreement procedure for the group, and means for receiving the group key and a session identification of the group from the gateway device, wherein the computing means compute an individual key of the apparatus from the group key, and wherein communication with a network application function is performed by using the session identification of the group, and/or by using a session identification of the apparatus, generated based on the session identification of the group and the unique identification of the apparatus.

The sending means may send an application request for communication with the application network function, the application request including the session identification of the group or the session identification of the apparatus.

The above means may be implemented by processing resources, memory resources and interfaces of the apparatus.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method for computing a group key for a group of machine type communication devices in an apparatus, comprising:

computing, by the apparatus, an intermediate group key based on unique identifications of member devices of the group of machine type communication devices;

computing, by the apparatus, an authentication item on the basis of the intermediate group key and a random value;

sending, by the apparatus, the random value to the member devices of the group not acting as a gateway device performing authentication and key agreement procedure for the group;

receiving, by the apparatus, key materials from the member devices computed based on the random value and the unique identifications of the member devices;

authenticating the member devices on the basis of the received key materials and the authentication item computed on the basis of the intermediate group key and the random value; and computing, by the apparatus after said authenticating, the group key from the materials of the member devices and a unique identification of the gateway device, wherein communication between the apparatus and a network application function is performed by using a session identification of the group, and/or by using a session identification of a member device of the group, generated based on the session identification of the group and the unique identification of the member device.

2. The method of claim 1, comprising:
recognizing that a request has been received from a member device of the group which acts as a gateway device performing authentication and key agreement procedure for the group, wherein the computing of the group key is performed in response to the request;
computing an authentication vector from the group key;
computing a serial of individual keys for each member device of the group; and
sending the authentication vector, the individual keys and a random value to a service function.

3. The method of claim 1, comprising:
sending a random value to member devices of the group not acting as a gateway device performing authentication and key agreement procedure for the group, wherein the random value is generated in the context of an authentication vector computed from the group key; and
receiving key materials from the member devices computed based on the random value and the unique identifications of the member devices,
wherein the group key is computed from the key materials of the member devices and the unique identification of the gateway device.

4. The method of claim 3, comprising:
sending the group key and the session identification of the group to the member devices.

5. The method of claim 3, comprising:
detecting a key material error and locating an erroneous member device of the group involving the key material error; and
sending an error message indicating the erroneous member device to a service function.

6. The method of claim 3, comprising:
sending an application request for communication with the application network function, the application request including the session identification of the group and/or the session identification of the member device.

7. The method of claim 1, comprising:
receiving a serial of individual keys for each member device of the group.

8. A method for use in a device which is a member device of a group of machine type communication devices, the method comprising:
receiving a random value which is generated in the context of an authentication vector computed from an intermediate group key based on a unique identification of the device;
computing a key material based on the received random value;
sending the key material to a member device of the group which acts as a gateway device performing authentication and key agreement procedure for the group;
receiving a group key and a session identification of the group from the gateway device; and
computing an individual key of the device from the group key,
wherein communication with a network application function is performed by using the session identification of the group, and/or by using a session identification of the device, generated based on the session identification of the group and the unique identification of the device.

9. The method of claim 8, comprising:
sending an application request for communication with the application network function, the application request including the session identification of the group or the session identification of the device.

10. A computer program product embodied in a non-transitory computer-readable medium and including a program for a processing device, comprising software code portions for performing the steps of claim 1 when the program is run on the processing device.

11. The computer program product according to claim 10, wherein the computer program product comprises a computer-readable medium on which the software code portions are stored.

12. An apparatus, to the apparatus comprising:
at least one memory comprising computer program code;
at least one processor;
wherein the at least one memory and the computer program code are configured, with the at least one processor, to cause the apparatus at least to:
compute an intermediate group key based on unique identifications of member devices of the group of machine type communication devices;
compute an authentication item on the basis of the intermediate group key and a random value;
send the random value to the member devices of the group not acting as a gateway device performing authentication and key agreement procedure for the group;
receive key materials from the member devices computed based on the random value and the unique identifications of the member devices;
authenticate the member devices on the basis of the received key materials and the authentication item computed on the basis of the intermediate group key and the random value; and
compute the group key from the key materials of the member devices and a unique identification of the gateway device,
wherein communication between the apparatus and a network application function is performed by using a session identification of the group, and/or by using a session identification of a member device of the group, generated based on the session identification of the group and the unique identification of the member device.

13. The apparatus of claim 12, configured to:
recognize that a request has been received from a member device of the group which acts as a gateway device performing authentication and key agreement procedure for the group, and compute the group key in response to the request;
compute an authentication vector from the group key;
compute a serial of individual keys for each member device of the group; and
send the authentication vector, the individual keys and a random value to a service function.

14. The apparatus of claim 12, configured to:
send a random value to member devices of the group not acting as a gateway device performing authentication and key agreement procedure for the group, wherein the random value is generated in the context of an authentication vector computed from the group key; and
receive key materials from the member devices computed based on the random value and the unique identifications of the member devices, wherein the apparatus is configured to compute the group key from the key materials of the member devices and the unique identification of the gateway device.

15. The apparatus of claim 14, configured to:

send the group key and the session identification of the group to the member devices.

16. The apparatus of claim 14, configured to:

detect a key material error and locate an erroneous member device of the group involving the key material error; and send an error message indicating the erroneous member device to a service function.

17. The apparatus of claim 14, configured to:

send an application request for communication with the application network function, the application request including the session identification of the group and/or the session identification of the member device.

18. The apparatus of claim 12, configured to:

receive a serial of individual keys for each member device of the group.

19. An apparatus which is a member device of a group of machine type communication devices, the apparatus comprising:

at least one memory comprising computer program code;

at least one processor;

wherein the at least one memory and the computer program code are configured, with the at least one processor, to cause the apparatus at least to:

receive a random value which is generated in the context of an authentication vector computed from an intermediate group key based on a unique identification of the apparatus;

compute a key material based on the received random value;

send the key material to a member device of the group which acts as a gateway device performing authentication and key agreement procedure for the group;

receive a group key and a session identification of the group from the gateway device; and compute an individual key of the apparatus from the group key, wherein communication with a network application function is performed by using the session identification of the group, and/or by using a session identification of the apparatus, generated based on the session identification of the group and the unique identification of the apparatus.

20. The apparatus of claim 19, configured to:

send an application request for communication with the application network function, the application request including the session identification of the group or the session identification of the apparatus.

* * * * *